3,258,489
N - (1 - AMINOCYCLOHEXYLMETHYL)ANILINES AND N - (1 - NITROCYCLOHEXYLMETHYL)ANILINES

Darrell D. Mullins, Nitro, W. Va., assignor to Monsanto Company, a corporation of Delaware
No Drawing. Filed June 14, 1963, Ser. No. 287,806
8 Claims. (Cl. 260—576)

This invention relates to new and useful compositions of matter. The invention particularly relates to N-(1-aminocyclohexylmethyl)anilines. These compounds may be obtained by reduction of the corresponding N-(1-nitrocyclohexylmethyl)anilines which precursers also appear to be new compounds. The N-(1-aminocyclohexylmethyl)anilines are in turn valuable intermediates for the preparation of compounds containing a secondary amino substituent in the 1-position of the cyclohexane ring.

The new compounds may be represented by the formula

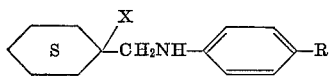

where X is $NO_2$ or $NH_2$ and R is H, alkoxy of 1–12 carbon atoms, alkyl of 1–12 carbon atoms, phenylamino, tolylamino, cyclohexylamino, or

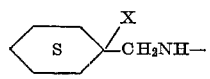

where X has the same significance as before. Besides being valuable intermediates these compounds are antioxidants for oxidizable substances which deteriorate by absorption of oxygen from the air, as for example rubber, gasoline, soap and vegetable oils. Some of them possess biological properties as hereinafter described.

Representative examples of the new compounds are

N-(1-nitrocyclohexylmethyl)aniline,
N-(1-aminocyclohexylmethyl)aniline,
N-(1-nitrocyclohexylmethyl)-p-toluidine,
N-(1-aminocyclohexylmethyl)-p-toluidine,
N-(1-aminocyclohexylmethyl)-p-octylaniline,
N-(1-aminocyclohexylmethyl)-p-dodecylaniline,
N-(1-nitrocyclohexylmethyl)-p-butoxyaniline,
N-(1-aminocyclohexylmethyl)-p-butoxyaniline,
N-(1-nitrocyclohexylmethyl)-p-octyloxyaniline,
N-(1-aminocyclohexylmethyl)-p-octyloxyaniline,
N-(1-aminocyclohexylmethyl)-p-dodecyloxyaniline,
N-(1-nitrocyclohexylmethyl)-N'-cyclohexyl-p-phenylenediamine,
N-(1-aminocyclohexylmethyl)-N'-cyclohexyl-p-phenylenediamine,
N-(1-nitrocyclohexylmethyl)-N'-(p-tolyl)-p-phenylenediamine and
N-(1-aminocyclohexylmethyl)-N'-(p-tolyl)-p-phenylenediamine.

The N-(1-nitrocyclohexylmethyl)anilines form from condensation of nitrocyclohexane, formaldehyde and aniline or substituted aniline. Reduction is preferably effected with elemental hydrogen in the presence of a hydrogenation catalyst. Compounds with a secondary amino substituent in the cyclohexane ring are also valuable antioxidants. These may be formed by isolating the free amino compound and alkylating in known manner or by reductive alkylation of the nitro compound with an aldehyde or ketone. Examples of compounds available through these reactions comprise N-(1-isopropylaminocyclohexylmethyl)-N'-phenyl-p-phenylenediamine,
N-(1-sec.-butylaminocyclohexylmethyl)-N'-phenyl-p-phenylenediamine,
N-[1-(1',3'-dimethylbutylamino)cyclohexylmethyl]-N'-phenyl-p-phenylenediamine,
N-[1-(1',4'-dimethylpentylamino)cyclohexylmethyl]-N'-phenyl-p-phenylenediamine,
N-[1-(1',3'-dimethylpentylamino)cyclohexylmethyl]-N'-phenyl-p-phenylenediamine,
N-(1-methylaminocyclohexylmethyl)-N'-phenyl-p-phenylenediamine,
N-(1-ethylaminocyclohexylmethyl)-N'-phenyl-p-phenylenediamine,
N-(1-benzylaminocyclohexylmethyl)-N'-phenyl-p-phenylenediamine,
N-(1-methylaminocyclohexylmethyl)aniline,
N-(1-ethylaminocyclohexylmethyl)aniline,
N-(1-isopropylaminocyclohexylmethyl)aniline,
N-(1-propylaminocyclohexylmethyl)aniline,
N-(1-sec.-hexylaminocyclohexylmethyl)aniline,
N-(1-sec.-octylaminocyclohexylmethyl)aniline,
N-(1-dodecylaminocyclohexylmethyl)aniline,
N-(1-phenylaminocyclohexylmethyl)aniline,
N-(1-methylaminocyclohexylmethyl)-p-isopropoxyaniline,
N-(1-methylaminocyclohexylmethyl)-p-hexyloxyaniline,
N-(1-methylaminocyclohexylmethyl)-p-octyloxyaniline,
N-(1-methylaminocyclohexylmethyl)-p-decyloxyaniline,
N-(1-isopropylaminocyclohexylmethyl)-p-phenetidine,
N-(1-isopropylaminocyclohexylmethyl)-p-octyloxyaniline,
N-(1-phenylaminocyclohexylmethyl)-p-phenetidine and
N-(1-cyclohexylaminocyclohexylmethyl)-N'-phenyl-p-phenylenediamine.

Reduction of the nitro compound is preferably carried out in the presence of finely divided nickel, at temperatures between 40–60° C. and hydrogen pressures of 50–80 pounds per square inch. Hydrogenation is preferably continued until hydrogen has been consumed in an amount corresponding approximately to that theoretically required for the conversion. The method of producing the various products of the invention will be understood from the following description and examples:

Example 1

A mixture was prepared containing 129.16 grams (1.0 mole) of nitrocyclohexane, 300 ml. of methanol, 93 grams (1.0 mole) of aniline and 5 ml. of benzyl trimethyl ammonium hydroxide. To this stirred mixture maintained at refluxing temperature (70° C.) was added dropwise in 5 hours, 100 grams (1.23 moles) of 37% formaldehyde. During the addition the temperature rose gradually to a maximum of 77° C. After addition was complete, the reaction was stirred at refluxing temperature for 3 hours. After cooling to 0–5° C. and stirring ½ hour longer, the product was filtered and washed with 75 ml. of cold methanol. The precipitate was air-dried at room temperature. N-(1-nitrocyclohexylmethyl)aniline was obtained as a yellow solid melting at 85–86° C. after recrystallization from heptane. Analysis gave 12.00% nitrogen (Dumas) compared to 11.96% calculated for $C_{13}H_{18}N_2O_2$.

Example 2

A mixture of 65.0 grams (0.2 mole) of N-(1-nitrocyclohexylmethyl)aniline produced as described in Example 1, 150 ml. of isopropanol and 12 grams (50% aqueous) of Raney nickel which had been washed twice with isopropanol was charged to an hydrogenator. Hydrogen was fed in at 50–60 pounds per square inch at 45–50° C. until the theoretical amount was taken up. After filtering out catalyst and stripping, 100% yield of N-(1-aminocyclohexylmethyl)aniline was obtained melting at 44–45° C. after recrystallization from heptane.

Example 3

To a reactor was charged 126 grams (0.975 mole) of nitrocyclohexane, 400 ml. of methanol, 7.5 ml. of benzyl trimethyl ammonium hydroxide and 184 grams (1.0 mole) of p-aminodiphenylamine. The mixture was stirred while adding dropwise at refluxing temperature (70° C.) 100 grams (1.23 moles) of 37% formaldehyde. After addition was complete the reaction was stirred at refluxing temperature for 12 hours. On cooling to 0–10° C. and seeding with a few crystals of the product of Example 1, the product solidified into light tan crystals. The solid was collected by filtration, washed with 100 ml. of cold methanol and 100 ml. of cold heptane and air-dried at room temperature. A 91% yield of N-(1-nitrocyclohexylmethyl) - N' - phenyl - p - phenylenediamine was obtained melting at 105–107° C. after recrystallization from alcohol. Analysis gave 12.93% nitrogen (Dumas) compared to 12.91% calculated for $C_{19}H_{23}N_3O_2$.

Example 4

Substituting N-(1-nitrocyclohexylmethyl)-N'-phenyl-p-phenylenediamine prepared according to Example 3 for the N-(1-nitrocyclohexylmethyl)aniline in the procedure of Example 2, N-(1-aminocyclohexylmethyl)-N'-phenyl-p-phenylenediamine was obtained in 100% yield. It may be purified by recrystallization from heptane. The compound, when pure, melts at 99–100° C.

Example 5

To a reactor was charged 64.5 grams (0.5 mole) of nitrocyclohexane, 150 ml. of isopropyl alcohol, 27 grams (0.25 mole) of p-phenylenediamine and 5 ml. of 25% sodium hydroxide. The mixture was stirred at 85–87° C. while adding dropwise, over a period of 2 hours, 50 grams (0.626 mole) of 37% formaldehyde. A solid began to form after one-half of the formaldehyde had been added. The stirred reaction mixture was heated at 85–87° C. for 2 hours, cooled to 5° C. and 150 ml. of cold heptane added. After stirring at 0–10° C. for 15 minutes, the precipitate was collected by filtration, washed with 200 ml. of heptane and air-dried at 25–30° C. N,N'-bis(1-nitrocyclohexylmethyl)-p-phenylenediamine was obtained in 96% yield as a tan solid melting at 188–189° C. after recrystallization from ethyl acetate. Analysis gave 14.20% nitrogen (Dumas) compared to 14.35% calculated for $C_{20}H_{30}N_4O_4$.

Example 6

To a reactor was charged 64.5 grams (0.5 mole) of nitrocyclohexane, 200 ml. of methanol, 5 ml. of benzyl trimethyl ammonium hydroxide and 68.5 grams (0.5 mole) of p-phenetidine. To this stirred solution at refluxing temperature (70–74° C.) was added dropwise over a period of 3 hours, 70 grams (0.78 mole) of 37% formaldehyde. The reaction mixture was heated at refluxing temperature for 12 hours, cooled to 0–5° C. and isolated as described in Example 3. N-(1-nitrocyclohexylmethyl)-p-phenetidine was obtained in 54% yield as a yellow solid melting at 69–71° C. after recrystallization from heptane. Analysis gave 10.98% nitrogen (Dumas) compared to 10.07% calculated for $C_{15}H_{22}N_2O_3$.

Example 7

A mixture of 69.5 grams (0.25 mole) of N-(1-nitrocyclohexylmethyl)-p-phenetidine, prepared as described in Example 6, 150 ml. of isopropanol and 13 grams (50% aqueous) of Raney nickel washed twice with isopropanol was charged to an hydrogenator and the product hydrogenated as herein described. A 93.2% yield of N-(1-aminocyclohexylmethyl)-p-phenetidine was obtained as an amber oil analyzing 10.96% nitrogen compared to 11.28% calculated for $C_{15}H_{24}N_2O$.

Example 8

To a reactor was charged 60 grams (0.487 mole) of nitrocyclohexane, 200 ml. of methanol, 5 ml. of benzyl trimethyl ammonium hydroxide and 61.5 grams (0.5 mole) of p-anisidine. To this stirred mixture, maintained at refluxing temperature, was added dropwise in 3 hours, 70 grams (0.78 mole) of 37% formaldehyde. After addition was complete the reaction was stirred at refluxing temperature for 3 more hours and then isolated as described in Example 1. The product thus obtained, N-(1-nitrocyclohexylmethyl)-p-anisidine, was charged to an hydrogenator together with 150 ml. of isopropanol and 13 grams of 50% aqueous Raney nickel which had been washed twice with isopropanol. After hydrogenating as above-described, N - (1 - aminocyclohexylmethyl) - p-anisidine was obtained as a tan solid melting at 62° C. after recrystallization from heptane.

Example 9

A mixture of 48.8 grams (0.125 mole) of N,N'-bis(1-nitrocyclohexylmethyl)-p-phenylenediamine produced as described in Example 5, 250 ml. of benzene, 150 ml. of isopropanol and 25 grams (50% aqueous) of Raney nickel, which had been washed twice with isopropanol, was charged to a 1-liter Parr pressure reaction apparatus and purged with nitrogen. Hydrogen was then fed in at 70–80 pounds per square inch at 50–60° C. for about 2 hours whereupon the catalyst was collected, washed with isopropanol and the filtrate stripped, finally in vacuo to 85° C. (maximum pot temperature) at about 125 mm. The product crystallized during distillation of the solvent and was dried in air to room temperature. N,N'-bis-(1-aminocyclohexylmethyl)-p-phenylenediamine was obtained as light tan crystals melting at 140–142° C. after recrystallization from dilute ethanol. Analysis gave 16.15% nitrogen compared to 16.95% calculated for $C_{20}H_{34}N_4$.

The new compounds disclosed herein are of use in several important applications. In low concentrations some of them are useful for combating microorganisms. For example, at a concentration of 0.1% N-(1-aminocyclohexylmethyl)-N'-phenyl-p - phenylenediamine, N - (1-aminocyclohexylmethyl)-p-phenetidine and N-(1-aminocyclohexylmethyl)-p-anisdine prevented growth of *Salmonella typhosa*. At this same concentration N-(1-aminocyclohexylmethyl)-p-phenetidine and N - (1 - aminocyclohexylmethyl)-p-anisidine prevented growth of *Staphylococcus aureus* while N - (1 - aminocyclohexylmethyl)-N'-phenyl-p-phenylenediamine prevented growth of this organism at a concentration of 0.01%.

Although both the nitro and amino bodies are antioxidants, the amines are more effective and are preferred. Substances which can be protected comprise natural rubber, cis-polybutadiene, cis-polyisoprene, butadiene-styrene copolymer rubber, butyl rubber, polyethylene, polypropylene, ethylene-propylene copolymer rubber and the like. As illustrative of antioxidant properties in sulfur-vulcanizable rubber compositions stocks were compounded comprising

| | Parts by weight | | | |
|---|---|---|---|---|
| Stock | A | B | C | D |
| Smoked sheets | 100 | 100 | 100 | 100 |
| Carbon black (Philblack O) | 50 | 50 | 50 | 50 |
| Zinc oxide | 5 | 5 | 5 | 5 |
| Hydrocarbon softener | 3 | 3 | 3 | 3 |
| Stearic acid | 3 | 3 | 3 | 3 |
| N-tert.-butyl 2-benzothiazole-sulfenamide | 0.5 | 0.5 | 0.5 | 0.5 |
| Sulfur | 2.5 | 2.5 | 2.5 | 2.5 |
| N-(1-nitrocyclohexylmethyl)-N'-phenyl-p-phenylenediamine | | 1.5 | | |
| N-(1-nitrocyclohexylmethyl) aniline | | | 1.5 | |
| N,N'-bis(1-nitrocyclohexylmethyl)-p-phenylenediamine | | | | 1.5 |

The compositions were then cured by heating 45 minutes at 144° C. and then aged. In the results recorded below test tube aging refers to results by the test tube method ASTM Designation D1206-54T. The ratio of retention of ultimate tensile strength was calculated by arbitrarily assigning a value of 100 to the unprotected control.

TABLE I

| Stock | Ratio of Percent Retention of Ultimate Tensile Strength Test Tube Aging | |
|---|---|---|
| | 48 Hrs. at 100° C. | 72 Hrs. at 100° C. |
| A | 100 | 100 |
| B | 279 | 343 |
| C | 154 | 189 |
| D | 166 | 164 |

Rubber stocks were compounded comprising

| Stock | Parts by weight | |
|---|---|---|
| | E | F |
| Smoked sheets | 100 | 100 |
| Carbon black (Philblack O) | 50 | 50 |
| Zinc oxide | 5 | 5 |
| Hydrocarbon softener | 3 | 3 |
| Stearic acid | 3 | 3 |
| Morpholino thiobenzothiazole | 0.5 | 0.5 |
| Sulfur | 2.5 | 2.5 |
| N-(1-aminocyclohexylmethyl)-N'-phenyl-p-phenylenediamine | | 1.5 |

The compositions were cured by heating 45 minutes in a press at 144° C. and then aged 48 hours at 100° C. in an aluminum block (test tube aging). The tensile strength in pounds per square inch before and after aging are set forth below:

TABLE II

| Stock | Tensile, Unaged | Tensile, Aged |
|---|---|---|
| E | 3,630 | 1,470 |
| F | 3,900 | 2,700 |

Other tests were carried out by aging in an aluminum block at 120° C. and one atmosphere of oxygen pressure. The samples were maintained at a constant elongation of 50% and the stress decay followed. The time in minutes to 50% of the initial stress is recorded below:

TABLE III

Stock: Minutes to 50% Retention of stress
E _____ 16
F _____ 88

Anti-exposure cracking tests were conducted by the stress relaxation method for measuring ozone cracking described by Decker and Wise in Rubber World, April 1962, pages 66–69. These are accelerated tests under dynamic conditions which simulate service conditions. The stocks were alternately stretched and relaxed on a reciprocating mechanism which imparted 25% strain to the test pieces 90 times each minute in an atmosphere which contained approximately 25 parts $O_3$ per hundred million. The extent of cracking in a test piece was determined by measuring the forces required to extend the test pieces 100% before and after exposure to ozone. As the strips began to crack the number of stress supporting rubber chains decreased and the force required to extend the strip 100% was reduced. The ratio of this force to the original force was calculated and the ability of the rubber to resist ozone cracking was obtained by a comparison of these numbers. These ratios are referred to as percent of the original modulus.

TABLE IV

| Stock | Hours to Indicated Percent of Original Modulus | | |
|---|---|---|---|
| | 90% | 80% | 70% |
| E | 2 | 5 | 10 |
| F | 6 | 16 | 32 |

It is intended to cover all changes and modifications of the examples of the invention herein chosen for purposes of disclosure which do not constitute departures from the spirit and scope of the invention.

What is claimed is:

1. A compound of the formula

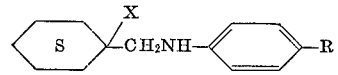

where X is selected from a group consisting of $NO_2$ and $NH_2$ and R is selected from a group consisting of hydrogen, alkoxy of 1 to 12 carbon atoms, alkyl of 1 to 12 carbon atoms, phenylamino, tolylamino, cyclohexylamino and

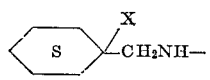

where X has the same significance as before.

2. A compound of the formula

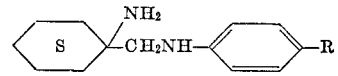

where R is alkyl of 1 to 12 carbon atoms.

3. A compound of the formula

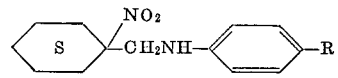

where R is alkyl of 1 to 12 carbon atoms.

4. N-(1-aminocyclohexylmethyl)-N'-phenyl-p-phenylenediamine.
5. N-(1-aminocyclohexylmethyl)aniline.
6. N-(1-aminocyclohexylmethyl)-p-phenetidine.
7. N-(1-nitrocyclohexylmethyl)-p-phenetidine.
8. N-(1-nitrocyclohexylmethyl)-N'-phenyl-p-phenylenediamine.

References Cited by the Examiner

UNITED STATES PATENTS

| | | | |
|---|---|---|---|
| 1,900,454 | 3/1933 | Marx et al. | 260—576 X |
| 1,924,441 | 8/1933 | Kranzlein et al. | 260—576 |
| 2,111,307 | 3/1938 | Bartram. | |
| 2,180,344 | 11/1939 | Blicke | 260—576 X |
| 2,256,186 | 9/1941 | Bogemann et al. | 260—576 |
| 2,393,889 | 1/1946 | Cook et al. | 260—516 X |
| 2,822,396 | 2/1958 | Dent | 260—576 |
| 3,061,585 | 10/1962 | Wilder | 260—576 X |

CHARLES B. PARKER, *Primary Examiner.*

IRVING MARCUS, *Examiner.*

DALE R. MAHANAND, *Assistant Examiner.*